United States Patent
Pitner et al.

(10) Patent No.: US 7,972,492 B2
(45) Date of Patent: Jul. 5, 2011

(54) ELECTROSYNTHESIS OF ORGANIC COMPOUNDS

(75) Inventors: William R. Pitner, Heppenheim (DE); Kenneth R. Seddon, Donaghadee (GB); Kenneth M. Stack, Canty Cappagh (IE); Alan Curzons, Worthing (GB); Richard Freer, London (GB)

(73) Assignee: The Queen's University of Belfast, Belfast (GB)

( * ) Notice: Subject to any disclaimer, the term of this patent is extended or adjusted under 35 U.S.C. 154(b) by 1569 days.

(21) Appl. No.: 10/482,796

(22) PCT Filed: Jul. 8, 2002

(86) PCT No.: PCT/GB02/03141
§ 371 (c)(1),
(2), (4) Date: Oct. 29, 2004

(87) PCT Pub. No.: WO03/004727
PCT Pub. Date: Jan. 16, 2003

(65) Prior Publication Data
US 2005/0051438 A1    Mar. 10, 2005

(30) Foreign Application Priority Data
Jul. 6, 2001 (GB) .................. 0116505.9

(51) Int. Cl.
*C25B 3/00* (2006.01)
*C25B 3/02* (2006.01)
*C25B 3/06* (2006.01)

(52) U.S. Cl. ........ 205/413; 205/431; 205/435; 205/436; 205/437; 205/446; 205/447; 205/448; 205/449; 205/455; 205/459

(58) Field of Classification Search .................. 205/354, 205/355, 357, 360, 413, 431, 435, 436, 437, 205/439, 440, 441, 443, 446, 447, 448, 449, 205/455, 459
See application file for complete search history.

(56) References Cited

U.S. PATENT DOCUMENTS
6,274,026 B1 * 8/2001 Schucker et al. ............ 205/696
2002/0177039 A1 * 11/2002 Lu et al. ...................... 429/213

FOREIGN PATENT DOCUMENTS
JP   59-219485   12/1984
WO   WO 99/41752   8/1999
WO   WO 01/40146 A1   6/2001

OTHER PUBLICATIONS

Howarth, "Oxidation of Aromatic Aldehydes in the Ionic Liquid [bmim]PF6", Tetrahedron Letters, vol. 41 (no month, 2000), pp. 6627-6629).*

(Continued)

*Primary Examiner* — Edna Wong
(74) *Attorney, Agent, or Firm* — Hodgson Russ LLP (57) ABSTRACT

Disclosed is a process for the electrochemical transformation of a compound to form a product, the process comprising (i) effecting the transformation in the presence of an electrolyte comprising at least one room temperature ionic liquid, wherein the ionic liquid is air-stable and moisture-stable, (ii) recovering the product, and optionally (iii) recovering the ionic liquid. The process can be used to effect the electrochemical transformation of a wide range of organic compounds.

30 Claims, 7 Drawing Sheets

OTHER PUBLICATIONS

Schroder et al., "Water-Induced Accelerated Ion Diffusion: Voltammetric Studies in 1-methyl-3-[2,6(S)-dimethylocten-2-yl]imidazolium tetrafluoroborate, 1-butyl-3-methylimidazolium tetrafluoroborate and hexafluorophosphate Ionic Liquids", New J. Chem. (no month, 2000), vol. 24, pp. 1009-1015.*

Sweeney et al., "Cyclic Voltammetric Study of the Catalytic Behavior of Nickel(I) Salen Electrogenerated at a Glassy Carbon Electrode in an Ionic Liquid (1-butyl-3-methylimidazolium tetrafluoroborate, BMIM+BF4-", Electrochemistry Comm. (no month, 2001), vol. 3, pp. 712-715.*

Earle et al., "Ionic Liquids. Green Solvents for the Future", Pure Appl. Chem. (no month, 2000), vol. 72, No. 7, pp. 1391-1398.*

Hitchcock et al., "1-Methyl-3-ethylimidazolium Hexachlorouranate(IV) and 1-Methyl-3-ethylimidazolium Tetrachlorodioxouranate(VI): Synthesis, Structure, and Electrochemistry in a Room Temperature Ionic Liquid", Inorganica Chimica Acta (no month, 1986), vol. 113, No. 2, L25-L26.*

Laali et al., "Electrophilic Nitration of Aromatics in Ionic Liquid Solvents", J. Org. Chem. (no month, 2001), vol. 66, pp. 35-40.*

Bonhôte et al., *Hydrophobic, Highly Conductive Ambient-Temperature Molten Salts*, Inorg. Chem. (1996) vol. 35, pp. 1168-1178.

Compton et al., *Direct Electrochemical Reduction of Hemin in Imidazolium-Based Ionic Liquids*, J. Electroanal. Chem. (Feb. 22, 2002) vol. 520, pp. 71-78.

Forsyth et al., *N-Methyl-N-Alkylpyrrolidinium Tetrafluoroborate Salts: Ionic Solvents and Solid Electorlytes*, Electrochimica Acta (Mar. 15, 2001) vol. 46, pp. 1753-1757.

Hagiwara et al., *Room Temperature Ionic Liquids of Alkylimidazolium Cations and Fluoroanions*, J. of Fluorine Chemistry (2000) vol. 105, pp. 221-227.

Holbrey et al, *Ionic Liquids*, Clean Products and Processes (1999) vol. 1, pp. 223-236.

Lipsjtajan et al., Database Compendex Online!, Engineering Information, Inc., New York, NY, U.S.; *Electrochemical Reduction of N-(1-Butyl) Pyridinium Cation in 1-Methyl-3-Ethylimidazolium Chloride-Aliminum Chloride Ambient Temperature Ionic Liquids*, Database accession No. EIX84120221223 XP002228999 abstract and Electrochim. Acta (Oct. 1984) vol. 29, No. 10, pp. 1349-1352.

McFarlane et al., *High Conductivity Molten Salts Based on the Imide Ion*, Electrochimica Acta (2000) vol. 45, pp. 1271-1278.

Sweeny et al., *Cyclic Voltammetric Study of the Catalytic Behaviour of Nickel (I) Salen Electrogenerated at a Glassy Carbon Electrode in an Ionic Liquid (1-Butyl-3-Methylimidazolium Tetrafluoroborate, BMIM+BF4-)*, Electrochemistry Communications (Dec. 2001) vol. 3, pp. 712-715.

Welton, *Room-Temperature Ionic Liquids. Solvents for Synthesis and Catalysis*, Chem. Rev. (1999) vol. 99, pp. 2071-2083.

Wilkes et al., *Air and Water Stable 1-Ethyl-3Methylimidazolium Based Ionic Liquids*, J. Chem. Soc. Chem. Commun. (1992) pp. 965-967.

Chemistry & Industry (Jul. 2, 2001) p. 413.

* cited by examiner

ELECTROSYNTHESIS OF ORGANIC COMPOUNDS

This invention relates to electrochemical transformations of organic compounds in ionic liquids. The present invention is primarily concerned with oxidation and/or reduction of the organic compound to produce a non-polymeric product.

Electrosynthesis, i.e. synthesis of organic compounds by electrochemical procedures, provides an attractive alternative to conventional methods used for conducting synthetic organic chemistry. Electrochemical procedures can be used to achieve a clean and complete conversion of a starting material to product without using hazardous or toxic experimental conditions.

Traditionally, electrosynthetic reactions are usually carried out in molecular solvents (both aqueous and non-aqueous); these solvents usually contain a supporting electrolyte to enhance the intrinsically poor electrochemical properties (e.g., low conductivity) of molecular solvents. The use of a supporting electrolyte may add significantly to the cost of the process and has the further disadvantage that it may require an additional purification step to separate it from the product.

Ionic liquids are a class of solvents which, unlike conventional molecular solvents, are completely ionised. Molten alkali metal halide salts (e.g. molten sodium chloride) are typical ionic liquids. In general, molten salts are thought of as possessing high melting points and being highly corrosive. However, this is not always the case.

The term "ionic liquid" refers to a liquid that is capable of being produced by melting a solid, and when so produced, consists solely of ions. Ionic liquids may be derived from organic salts, especially salts of heterocyclic nitrogen-containing compounds.

Ionic liquids may be regarded as consisting of two components, which are a positively charged cation and a negatively charged anion. An ionic liquid may be formed from a homogeneous substance comprising one species of cation and one species of anion, or can be composed of more than one species of cation and/or anion. Thus, an ionic liquid may be composed of more than one species of cation and one species of anion. An ionic liquid may further be composed of one species of cation, and one or more species of anion.

The term "ionic liquid" as used herein may refer to a homogeneous composition consisting of a single salt (one cationic species and one anionic species) or it may refer to a heterogeneous composition containing more than one species of cation and/or more than one species of anion.

The term "ionic liquid" includes compounds having both high melting temperature and compounds having low melting temperatures. Organic salts often have much lower melting points, in many cases below 373 K. Thus, many organic salts have melting temperatures of less than 100° C. Some organic salts have melting temperatures well below 0° C.

The term "room temperature ionic liquid" is used to describe a class of ionic liquids having melting temperatures at or below room temperature. Thus, such ionic liquids may have melting temperatures below about 40° C., preferably below about 35° C. and even more preferably, below about 25° C. Typical melting temperatures may range from −50° C. to 30° C., preferably −20° C. to 25° C. and more preferably −10° C. to 25° C.

A feature of room temperature ionic liquids is that they have particularly low (essentially zero) vapour pressures. Additionally, ionic liquids generally remain liquid over a large temperature range.

One of the first examples of a room temperature ionic liquid is ethylammonium nitrate. U.S. Pat. Nos. 2,445,331, 2,446,349 and 2,446,350 describe the use of mixtures of aluminium halides and N-alkylpyridinium halide salts for electrodepositing aluminium. However, the air- and moisture-sensitivity of ionic liquids containing aluminium halides limited their use as solvents. Although ionic liquids have been employed in the synthesis of organic compounds, there are, however, very few examples of electrochemical synthesis using ionic liquids.

R. T. Carlin & P. C. Truelove, *Electrochimica Acta,* 37 (1992) 2615-2628, G. T. Cheek & R. A. Osteryoung, *J. Electrochem. Soc.,* 129 (1982) 2488-2496, M. Lipsztajn & R. A. Osteryoung, *Inorg. Chem.,* 24 (1985) 716-719 and C. L. Hussey & L. A. King, in *Proceedings of the Electrochemical Society*: Second International Symposium on Molten Salts, Vol. PV 81-10, J. Braunstein & J. R. Selman (Eds), The Electrochemical Society, Inc, Pennington N.J. (1981) describe electrochemical studies in ionic liquids. However, these references do not disclose the use of ionic liquids in synthetic applications to produce organic compounds. In the electrochemical studies, no details are provided as to whether or how a product may be isolated. Thus, the application of this technology to molecular electrosynthesis remains largely unexplored.

Most of the examples of the use of ionic liquids in synthesis to date are concerned with electropolymerisations. For example, J. S. Tang, & R. A. Osteryoung, *Syn. Met.,* 45 (1991), 1-13 discloses the formation of polyaniline by electrochemical oxidation in a mixture of aluminium chloride and 1-methyl-3-ethylimidazolium chloride. The polyaniline is deposited as a film on an electrode.

G. T. Cheek, & R. B. Herzog, in *Proceedings of the Electrochemical Society: fourth international symposium on molten salts*, Vol. PV 84-2, M. Blander, D. S. Newman, M.-L. Saboungi, G. Mamantov & K. Johnson (Eds), The Electrochemical Society, Inc., Pennington N.J., (1984) discloses the electrochemical reduction of aromatic ketones in 1-methyl-3-butylimidazolium chloroaluminate systems. The products are isolated by hydrolysis of the melt with water, followed by extraction. The ionic liquid is thus destroyed in this process and cannot therefore be reused.

J. E. Coffield & G. Mamantov, *J. Electrochem. Soc.,* 138 (1991) 2543-2549 and J. E. Coffield & G. Mamantov, *J. Electrochem. Soc.,* 139 (1992) 355-359 respectively disclose the electrochemical reduction of phenazine and perylene in basic mixtures of $AlCl_3$ and 1-ethyl-3-methylimidazolium chloride or neat 1-ethyl-3-methylimidazolium hydrogen dichloride [emim][$HCl_2$]. The ionic liquids employed are moisture sensitive and are destroyed in the aqueous work-up.

Thus, a particular disadvantage of the prior art procedures discussed above is that the ionic liquids employed are air- and moisture-sensitive ionic liquids based on mixtures of aluminium chloride (or its derivatives). These react with water to form hydrochloric acid, chloroxoaluminates and chlorohydroxoaluminates. The ionic liquid [emim][$HCl_2$] is also prone to evolve hydrochloric acid in the presence of atmospheric moisture. Such solvents have obvious drawbacks in that their preparation, handling and storage must be done under an inert atmosphere (e.g. by the use of Schlenk apparatus or a glove box). In addition, product isolation is usually carried out by quenching the ionic liquid with water. Such isolation is disadvantageous in that hydrochloric acid may be generated and importantly, the ionic liquid is destroyed and thus cannot be reused.

N. L. Weinberg, A. Kentaro Hoffmann and T. B. Reddy, *Tet. Lett,* 12 (25) 1971, 2271-2274 discloses the electrochemical reductive carboxylation of benzalaniline in molten tetraethyl ammonium p-toluenesulfonate. Tetraethyl ammonium p-toluenesulfonate has a high melting point, so it is necessary to conduct the reaction at a temperature of 140° C. The use of a high melting ionic liquid has its drawbacks since it is necessary to maintain the high temperature to keep the reaction mixture in the liquid phase. In the disclosed process, the product is isolated by pouring the catholyte into cold water and extracting the aqueous solution with trichloromethane. This document does not suggest the reuse of the ionic liquid, but because tetraethyl ammonium p-toluenesulfonate is highly soluble in water, it is necessary to remove the large quantities of water before it can be reused. Furthermore, since tetraethyl ammonium p-toluenesulfonate is hygroscopic, it must be handled in anhydrous conditions.

Air- and moisture-stable room temperature ionic liquids are known [see, e.g. J. S. Wilkes & M. J. Zoworotko, *J. Chem. Soc. Chem. Comm.* (1992), 965-967, J. D. Holbrey & K. R. Seddon, *Clean Products and Processes*, 1, (1999), 223-236, T. Welton, *Chem. Rev.*, 99, (1999), 2071-2083, and P. Bonhote, A.-P Dias, N. Papageorgiou, K. Kalyanasundaram & M. Graltzel, *Inorg. Chem.* 35 (1996), 1168-1178)].

Typical cations found in room temperature ionic liquids include N-alkylpyridinium, N,N'-dialkylimidazolium, tetraalkylammonium, and N,N-dialkylpyrrolidinium. Typical anions include chloride, nitrate, ethanoate, hexafluorophosphate, tetrafluoroborate, triflate, triflimide, and trifluoroethanoate.

Since the introduction of air- and moisture-stable ionic liquids, the use of ionic liquids in a number of organic synthetic processes have been investigated. Examples of such processes include acylative cleavage of ethers, alkylation, amidocarbonylation, catalytic cracking, the Diels-Alder reaction, 1,3-dipolar cycloaddition, dimerization, enzymatic catalysis, epoxidation, hydrodimerization, the Friedel-Crafts reaction, the Heck coupling, hydrogenation, multiphase bioprocessing, oxidation of aromatic aldehydes and polymerization. U.S. Pat. No. 6,274,026 discloses the use of ionic liquids in the treatment of naphtha by electrochemical oligomerisation of sulfur compounds at temperature ranges of 0-200° C. The polymeric sulfur compounds are deposited onto the anode. Eventually, the anode must be replaced.

To date, the electrosynthesis of a non-polymeric organic compound in a room temperature air- and moisture-stable ionic liquid which can be recovered without destroying the ionic liquid has not been reported.

It is therefore an object of the present invention to overcome at least some of the disadvantages with prior art processes. A further object of the present invention is to provide a process in which the ionic liquid can be recovered and reused.

Accordingly, one aspect of the present invention provides a process for the electrochemical transformation of a compound to form a product, said process comprising the steps of:
(i) effecting said transformation in the presence of an electrolyte comprising at least one room temperature ionic liquid, said ionic liquid being air-stable and moisture-stable, and
(ii) recovering the product.

The use of an air- and moisture-stable room temperature ionic liquid in a process for electrochemical transformation of a compound in accordance with the present invention is particularly advantageous over conventional solvents typically used in electrochemical experiments. Thus, their polar nature allows them to dissolve large concentrations of a wide variety of organic and inorganic compounds. Furthermore, the ionic liquids employed in the present invention have extremely large electrochemical windows, in certain cases over five volts. Additionally, as they are completely ionised, the need for a supporting electrolyte is eliminated.

As indicated above, the term "room temperature ionic liquid" for the purpose of the present invention means that the ionic liquid has a melting temperature at or below room temperature. Thus, such ionic liquids may have melting points below about 40° C., preferably below about 35° C. and even more preferably, below about 25° C. Typical melting points may range from −50° C. to 30° C., preferably −20° C. to 25° C. and more preferably −10° C. to 25° C. Preferably, for the purpose of the present invention, the ionic liquid electrolyte is liquid at a temperature of 28° C. or lower.

Since the ionic liquid employed in the present process is air- and moisture-stable, the reactions can be carried out under more robust conditions and at lower temperatures and the recovery of the product can be effected without the destruction of the electrolytic medium. Thus, in a preferred embodiment of the present process, the ionic liquid is recovered from the reaction mixture.

The electrochemical transformation of the compound is preferably an oxidation, reduction, or a coupled pair of oxidation and reduction. It will be appreciated that the present process can be applied to the electrochemical transformation of a wide variety of organic substrates. Thus, compounds that can be employed in the present process may include those comprising at least one structural element selected from the following: a carbon-halogen bond, a C=C double bond, a C≡C triple bond, an ester group, an ether group, a carboxylic acid group, an amino group, an amido group, an imido group, —OH, —NO$_2$, —C≡N, an aldehyde group and a keto group, and wherein said structural element is oxidized or reduced.

Typical reactions in which the structural element is reduced involve the addition of one or more hydrogen atoms. Examples of such reactions include:

conversion of keto groups >C=O to alcohol groups —C(H)(OH), conversion of keto groups >C=O to methylene groups —CH$_2$—, conversion of aldehyde groups —CHO to alcohol groups —C(H)(OH), conversion of aldehyde groups —CHO to methylene groups —CH$_2$, conversion of alkynyl groups —C≡C— to alkenyl groups >C=C<, conversion of alkenyl groups >C=C< to alkyl groups >C—C<, conversion of imido groups >C=NH to amino groups >CH—NH$_2$, conversion of cyano groups —C≡N to amino groups >CH—NH$_2$, conversion of a nitro group —NO$_2$ to amino groups —NH$_2$.

Preferred compounds for use in the present process include those comprising at least one structural element selected from the following: a carbon-halogen bond, a C=C double bond, an ester group, a carboxylic acid group, an amino group, an amido group, an imido group, NO$_2$, an aldehyde group and a keto group.

The present invention is particularly useful for the electrochemical transformation of compounds comprising at least one structural element selected from the following: NO$_2$, an imido group, an aldehyde group and a carboxylic acid group.

Particular examples of electrochemical transformations include:

the oxidative nitration of aryl compounds to nitro-aryl compounds

R=alkyl, O-alkyl, NH$_2$, CN, etc an example of this is the production of nitrobenzene from benzene:

the reduction of nitro-aryl compounds to amino-aryl compounds

R=alkyl, O-alkyl, NH$_2$, CN, etc an example of this is the production of aniline from nitrobenzene:

the reduction of benzoic acids to benzaldehydes and/or benzyl alcohols

R=alkyl, O-alkyl, NH$_2$, CN, etc an example of this reaction is the conversion of anisic acid to anisaldehyde and/or anisyl alcohol The room temperature ionic liquid may be composed of any combination of cation or anion which forms a liquid at room temperature and is stable in the presence of oxygen (i.e. air-stable) and moisture.

It will be appreciated that both the role of the cation and the anion are important factors in determining whether the ionic liquid is air or moisture stable. Thus, if either the anion or cation react with air or moisture, the ionic liquid will not be air or moisture stable. Thus, in the case of the prior art chloroaluminate-anion based ionic liquids, the reactivity of the chloroaluminate species to air and moisture means that the resulting ionic liquid is unstable to air and moisture.

Preferred air- and moisture-stable room temperature ionic liquids for use in the present invention include those comprising an imidazolium, pyridinium, pyridazinium, pyrazinium, oxazolium, triazolium, pyrazolium, pyrrolidinium, piperidinium, tetraalkylammonium or tetraalkylphosphonium salt. Especially preferred are ionic liquids comprising an imidazolium, pyridinium, pyridazinium, pyrazinium, oxazolium, triazolium, pyrazolium, pyrrolidinium or piperidinium salt. Particularly preferred ionic liquids for use in the process of the present invention comprise an imidazolium, pyridinium or pyrrolidinium salt.

Especially preferred ionic liquids include those selected from the following:

-continued wherein
- each $R^a$ is independently selected from a $C_1$ to $C_{40}$ straight chain or branched alkyl or a $C_3$ to $C_8$ cycloalkyl group, wherein said alkyl or cycloalkyl group which may be substituted by one to three groups selected from: $C_1$ to $C_6$ alkoxy, $C_6$ to $C_{10}$ aryl, CN, OH, $NO_2$, $C_1$ to $C_{30}$ aralkyl and $C_1$ to $C_{30}$ alkaryl;
- each $R^b$, $R^c$, $R^d$, $R^e$, $R^f$, $R^g$ and $R^h$ can be the same or different and are each independently selected from H or any of the $R^a$ groups as defined above; and
- $[A]^{n-}$ represents an anion having a charge $n^-$; wherein n may be 1-3.

Within this group of ionic liquids, the following are preferred:

wherein $[A]^{n-}$, $R^a$-$R^h$ and n are as defined above.

Further preferred ionic liquids are those selected from the following formulae:

wherein $[A]^{n-}$, $R^a$-$R^h$ and n are as defined above.

Even more preferred ionic liquids for use in the present process are those having the following formula:

wherein [A]$^{n-}$, R$^a$, R$^b$, R$^c$, R$^d$, R$^e$, R$^g$ and n are as defined above.

Good results have been obtained with 1,3-dialkylimidazolium cation-based ionic liquids, i.e. those of formula:

wherein [A]$^{n-}$, R$^a$, R$^g$ and n are as defined above.

In the above formulae, each R$^a$ preferably represents C$_1$ to C$_{40}$, more preferably C$_1$ to C$_{20}$, straight chain or branched alkyl. Especially preferred are those wherein each R$^a$ represents C$_1$ to C$_8$ straight chain or branched alkyl group.

In the above formulae, R$^g$ and R$^h$ preferably each represents C$_1$ to C$_{40}$, preferably C$_1$ to C$_{20}$, straight chain or branched alkyl. Especially preferred are those wherein R$^g$ and R$^h$ represents C$_1$ to C$_8$ straight chain or branched alkyl.

Also preferred are ionic liquids of any the above formulae wherein R$^b$, R$^c$, R$^d$, R$^e$, R$^f$, R$^g$ and R$^h$ each represents hydrogen.

Further preferred are ionic liquids of any of the above formulae wherein R$^a$, R$^g$ and R$^h$ each represents C$_1$-C$_{40}$, preferably C$_1$-C$_{20}$ and more preferably C$_1$-C$_8$ alkyl.

The group [A]$^{n-}$ in the above formulae preferably represents a single species of anion A having valency n.

In the above formulae, n is preferably 1.

In the above formulae, [A]$^{n-}$ preferably represents an anion selected from [Cl]$^-$, [Br]$^-$, [I]$^-$, boron or phosphorus fluorides, [NO$_3$]$^-$, [SO$_4$]$^-$, [HSO$_4$]$^-$, [HCO$_3$]$^-$, [(CF$_3$SO$_2$)$_2$N]$^-$, [AsF$_6$]$^-$, [SbF$_6$]$^-$, aryl sulfonates, alkylsulfonates, mono- or difluorinated alkyl sulfonates including perfluorinated alkylsulfonates, carboxylic acid anions, fluorinated carboxylic acid anions and metal halides.

Other anions include those based on [AsF$_6$]$^-$, [SbF$_6$]$^-$, [PF$_6$]$^-$ and [BF$_4$]$^-$, wherein one or more of the fluorine atoms are substituted by C$_1$ to C$_{20}$ (preferably C$_1$ to C$_8$) straight chain or branched alkyl, such as methyl, ethyl, propyl and butyl.

Of these, [Cl]$^-$, [Br]$^-$, [I]$^-$, boron or phosphorus fluorides, [NO$_3$]$^-$, [SO$_4$]$^-$, [HSO$_4$]$^-$, [HCO$_3$]$^-$, [(CF$_3$SO$_2$)$_2$N]$^-$, [AsF$_6$]$^-$, [SbF$_6$]$^-$, alkylsulfonates, mono- or difluorinated alkyl sulfonates including perfluorinated alkylsulfonates, carboxylic acid anions, fluorinated carboxylic acid anions and metal halides are preferred.

Especially preferred are ionic liquids of the above formulae wherein [A]$^{n-}$ represents an anion selected from [PF$_6$]$^-$, [BF$_4$]$^-$, [OSO$_2$CF$_3$]$^-$, [OSO$_2$(CF$_2$)$_3$CF$_3$]$^-$, [(CF$_3$SO$_2$)$_3$C]$^-$, [CH$_3$CH$_2$SO$_3$]$^-$, [OCO$_2$CF$_3$]$^-$, [OCO$_2$(CF$_2$)$_3$CF$_3$]$^-$, [OCO$_2$CH$_3$]$^-$, nitrate, sulfate, hydrogensulfate, hydrogencarbonate, acetate, trifluoroacetate, lactate, [(CF$_3$SO$_2$)$_2$N]$^-$, [B(alkyl)$_4$]$^-$ wherein each alkyl can be the same or different and can be any straight chain or branched C$_1$ to C$_{10}$ alkyl group, [SbF$_6$]$^-$ and [AsF$_6$]$^-$.

Ionic compounds of the above formulae wherein [A]$^{n-}$ represents an anion selected from [PF$_6$]$^-$, [BF$_4$]$^-$, [OSO$_2$CF$_3$]$^-$, [OSO$_2$(CF$_2$)$_3$CF$_3$]$^-$, [OCO$_2$CF$_3$]$^-$, [OCO$_2$(CF$_2$)$_3$CF$_3$]$^-$, [OCO$_2$CH$_3$]$^-$, [(CF$_3$SO$_2$)$_2$N]$^-$, [B(alkyl)$_4$]$^-$ wherein each alkyl can be the same or different and can be any straight chain or branched C$_1$ to C$_{10}$ alkyl group, [SbF$_6$]$^-$ and [AsF$_6$]$^-$ are also preferred, with [PF$_6$]$^-$, [BF$_4$]$^-$ and [(CF$_3$SO$_2$)$_2$N]$^-$ being especially preferred.

Particularly preferred ionic liquids are 1-butyl-3-methylimidazolium hexafluorophosphate or N-butyl-N-methylpyrrolidinium bis(trifluoromethanesulfonyl)imide.

Other air-and moisture-stable room temperature ionic liquids which are particularly suitable for the present process include the following:

1-butyl-3-methylimidazolium hexafluorophosphate (bmimPF$_6$),
1-hexyl-3-methylimidazolium hexafluorophosphate (C$_6$mimPF$_6$),
1-octyl-3-methylimidazolium hexafluorophosphate (C$_8$mimPF$_6$),
1-decyl-3-methylimidazolium hexafluorophosphate (C$_{10}$mimPF$_6$),
1-dodecyl-3-methylimidazolium hexafluorophosphate (C$_{12}$mimPF$_6$),
1-ethyl-3-methylimidazolium bis((trifluoromethyl)sulphonyl)amide (emimNTf$_2$),
1-hexyl-3-methylimidazolium bis((trifluoromethyl)sulphonyl)amide (C$_6$mimNTf$_2$),
1-hexylpyridinium tetrafluoroborate (C$_6$py BF$_4$),
1-octylpyridinium tetrafluoroborate (C$_8$py BF$_4$), and
1-butyl-3-methylimidazolium tetrafluoroborate (bmimBF$_4$).

Air- and moisture-stable room temperature ionic liquids can generally be classed as being hydrophilic or hydrophobic depending upon their miscibility with water. Thus, a hydrophilic ionic liquid is one which is completely miscible with water, whereas a hydrophobic ionic liquid is one which is substantially immiscible with water. By substantially immiscible, it is meant that up to 10% by volume, preferably up to 5% by volume, and even more preferably up to 1% by volume, water can dissolve in the ionic liquid to form a single phase. Typically, the amount of water that can be dissolved in the hydrophobic ionic liquid is 0-2% by volume, although 0-0.5% by volume is preferred).

Many electrochemical reactions require the presence of protons. Generally, most room temperature ionic liquids are aprotic, i.e., they do not contain free protons. Thus, it may be necessary to add a proton source depending upon the electrochemical transformation to be effected. Typically, the proton source is selected from phenol, a mineral acid, an organic acid, a conjugate acid (H[A]) of the anion A, or water. Of these, phenol, HCl, HNO$_3$, HBF$_4$, CH$_3$COOH and water are preferred, with phenol being especially preferred.

Although the ionic liquid electrolyte medium is liquid at room temperature, the electrochemical transformation need not take place at room temperature. Although it is preferred that the electrochemical transformation is conducted at ambient temperatures (e.g. up to 40° C., preferably up to 35° C., even more preferably up to 25° C.—with ranges of—10° C. to 25° C. and 0° C. to 25° C. being especially preferred), the electrochemical transformation can be conducted at any temperature that is within the molten range of the electrolyte and which is most appropriate for the highest and most selective yield of the desired product.

Advantageously, the present process provides the facile separation of a desired product of the electrochemical transformation from the reaction mixture. The separation may typically involve solvent extraction, distillation, precipitation or decantation of the product or ionic liquid layer if the product is immiscible with the ionic liquid.

A further advantage of the present process is that the air- and moisture-stable room temperature ionic liquid employed in the present invention is not destroyed by the addition of water, and can be easily recovered from the reaction mixture, thus offering the possibility of recycling and reuse of the ionic liquid.

Thus, when an air- and moisture stable room temperature ionic liquid that is substantially immiscible with water is employed as an electrolyte, the product may be extracted from ionic liquid in an aqueous phase. The ionic liquid may then be used, either directly or after treatment (e.g. to remove small amounts of water or proton donor). Unlike tetraethylammonium p-toluenesulfonate which is not a room temperature ionic liquid, it is possible to reuse the ionic liquids employed in the present invention directly, i.e. without further treatment, even if trace amounts of water are present. For example, the water present may act as a proton donor, thus obviating the need for the separate addition of a proton donor.

BRIEF DESCRIPTION OF THE DRAWINGS

The invention will be described in more detail by way of the following figures and examples.

The following example illustrates a process for the reduction of N-methylphthalimide wherein the reaction medium is 1-butyl-3-methylimidazolium hexafluorophosphate.

EXAMPLE

Figure 1:
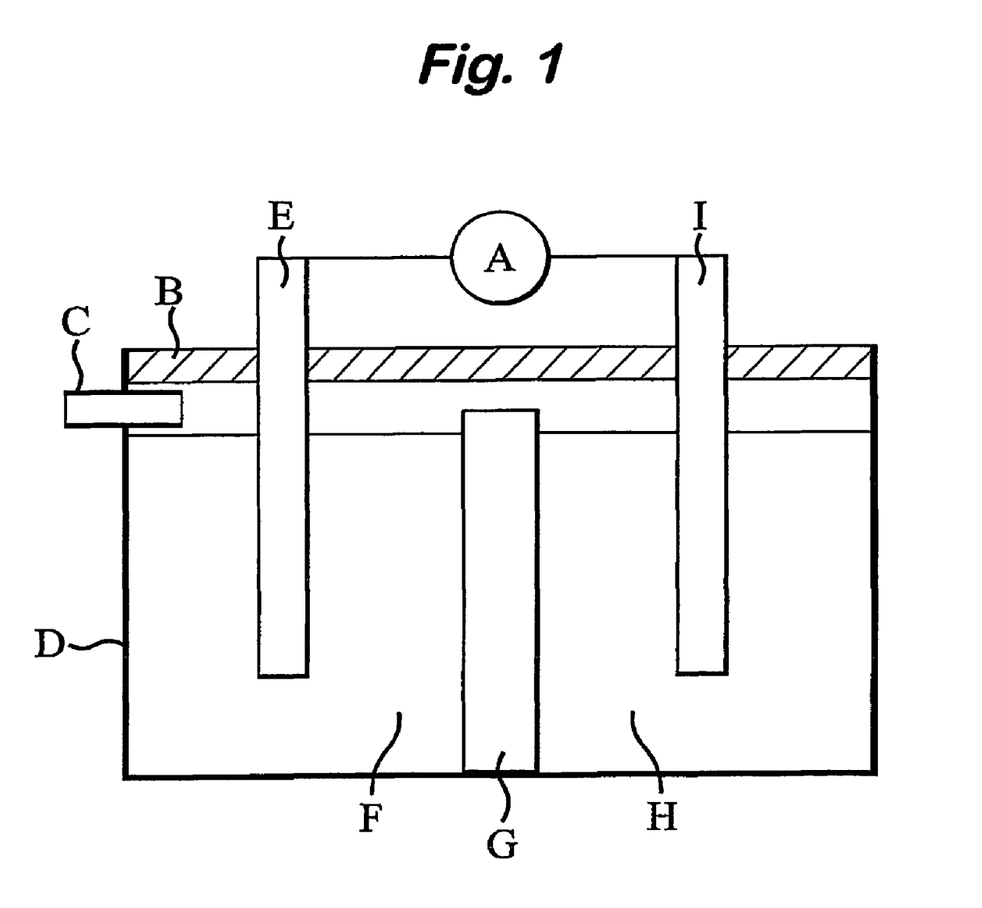
FIG. 1: Schematic design of an electrochemical cell typically employed in organic electrosynthesis: (A) electrical power source; (B) cell top; (C) purge gas inlet; (D) cell vessel; (E) cathode; (F) catholyte; (G) cell membrane; (H) anolyte; (I) anode.

Electrochemical synthesis was carried out in the air- and moisture-stable room-temperature ionic liquid, 1-butyl-3-methylimidazolium hexafluorophosphate [bmim][PF$_6$]. The reduction of N-methylphthalimide was investigated at glassy carbon electrodes. Cyclic voltammetric experiments indicate that the imide is reduced in two single-electron reductions. In the presence of phenol, the reduction of the imide takes place at a more anodic potential and occurs in a single two-electron step. Exhaustive electrolysis of N-methylphthalimide was carried out in an electrochemical cell (FIG. 1) at a glassy carbon cathode in the presence of phenol. 3-hydroxy-2-methyl-isoindolin-1-one was isolated as the product (Equation [1]).

Figure 2:
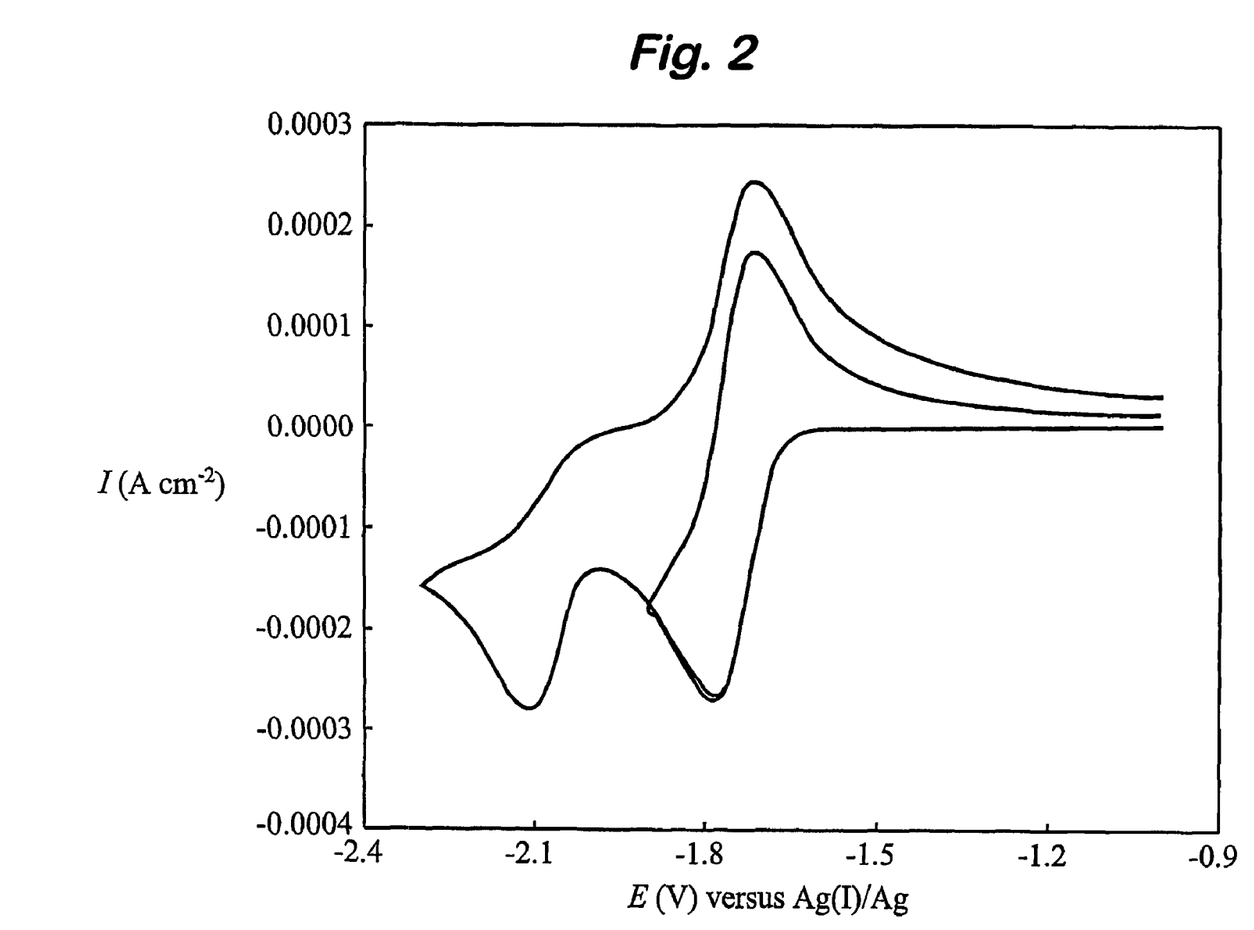
FIG. 2: Cyclic voltammogram recorded at a glassy carbon disk electrode in a 0.205 mol L$^{-1}$ solution of N-methylphthalimide in the [bmim][PF$_6$] ionic liquid at 298 K. The scans were initiated from −1.0 V toward more cathodic potentials with v=0.040 V s$^{-1}$.

Two typical cyclic voltammograms recorded in a 0.205 mol L$^{-1}$ solution of N-methylphthalimide in the [bmim][PF$_6$] ionic liquid at a glassy carbon disk electrode are shown in FIG. 2. For these voltammograms, the potential was initially held at −1.0 V at which no electrochemical reaction takes place and then lowered at a constant rate toward more cathodic potentials; at the switching potential, E$_\lambda$, the scan was reversed and the potential raised until it had reached the initial potential. Potentials less than −2.4 V were avoided to avoid reduction of the ionic liquid. For E$_\lambda$≧−2.0 V, the voltammogram exhibited a single reduction wave on the forward scan with a peak cathodic potential E$_p^c$=−1.78 V and a single oxidation wave on the reverse scan with a peak anodic potential E$_p^a$=−1.71 V. These waves are attributed to the reversible reduction of the imide to a radical anion (Equation [2]).

$$R+e^- \leftrightarrow R^{\cdot-} \quad [2]$$

As E$_\lambda$ is made more cathodic, a second reduction wave with E$_p^c$=−2.10 V becomes evident. There is no oxidation wave associated with this second reduction wave. This reduction wave is attributed to the reduction of the imide radical anion to a di-anion (Equation [3]).

$$R^{\cdot-}+e^- \leftrightarrow R^{2-} \quad [3]$$

The absence of an oxidation wave on the return sweep is an indication that the di-anion is highly reactive and undergoes a chemical reaction transforming into an electrochemically inert species following the electrochemical reduction. This probably occurs through protonation by the acidic proton of the [bmim] cation.

In electrochemical reductions that require protonation of the product, phenol is often used as a proton donor. The addition of phenol markedly alters the redox behaviour of the imide, as demonstrated in FIG. 3.

Figure 3:
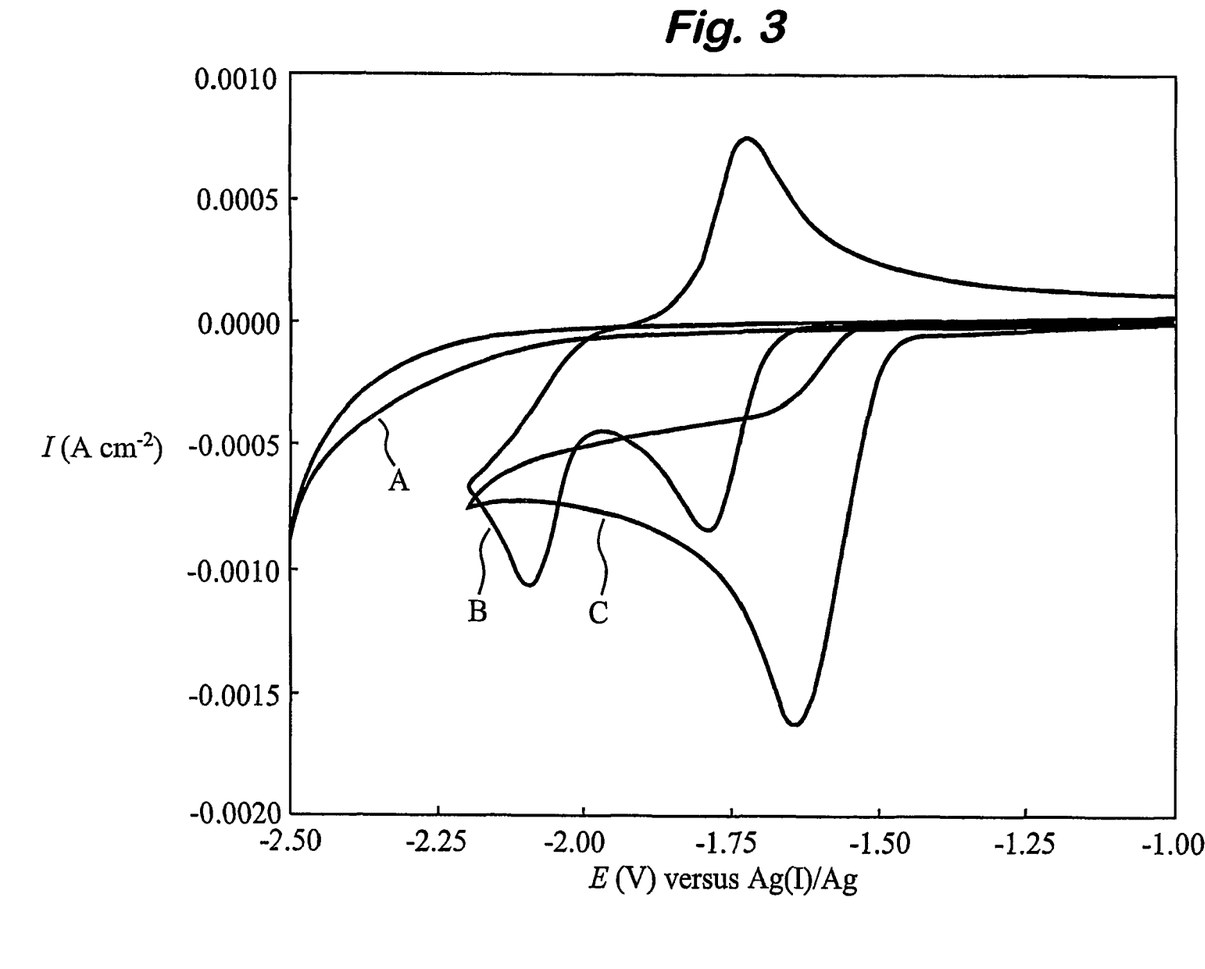
FIG. 3: Cyclic voltammograms recorded at a glassy carbon disk electrode in solutions of [bmim][PF$_6$] ionic liquids at 298 K containing: (A) 1.0 mol L$^{-1}$ phenol; (B) 0.10 mol L$^{-1}$ N-methylphthalimide; (C) 1.0 mol L$^{-1}$ phenol and 0.10 mol L$^{-1}$ N-methylphthalimide. The scans were initiated from −1.0 V toward more cathodic potentials with v=−0.040 V s$^{-1}$.

Voltammogram A was recorded in a 0.8 mol L$^{-1}$ solution of phenol in [bmim][PF$_6$]. This voltammogram shows that phenol is electrochemically inactive at potentials greater than −2.15 V. Voltammogram B was recorded in a 0.10 mol L$^{-1}$ solution of N-methylphthalimide in [bmim][PF$_6$], and is similar to those voltammograms in FIG. 1. The reduction wave for the loss of the first electron has $E_p^c$=−1.79 V and $I_p^c$=0.84 mA cm$^{-2}$.

Voltammogram C was recorded in the same solution of N-methylphthalimide after the addition of approximately 10 equivalents of phenol. In marked contrast to the reduction of the imide by itself, there is a single reduction wave with $E_p^c$=−1.64 V and $I_p^c$=1.62 mA cm$^{-2}$. This peak current is about twice that of the one-electron process in Voltammogram B; this indicates that the single wave in Voltammogram C is a two-electron process. The difference in the peak cathodic potentials of the first one-electron reduction in Voltammogram B and the two-electron reduction in Voltammogram C is 0.15 V. There is no oxidation wave on the return sweep, indicating that the product undergoes a chemical reaction following electrochemical reduction.

Figure 4:
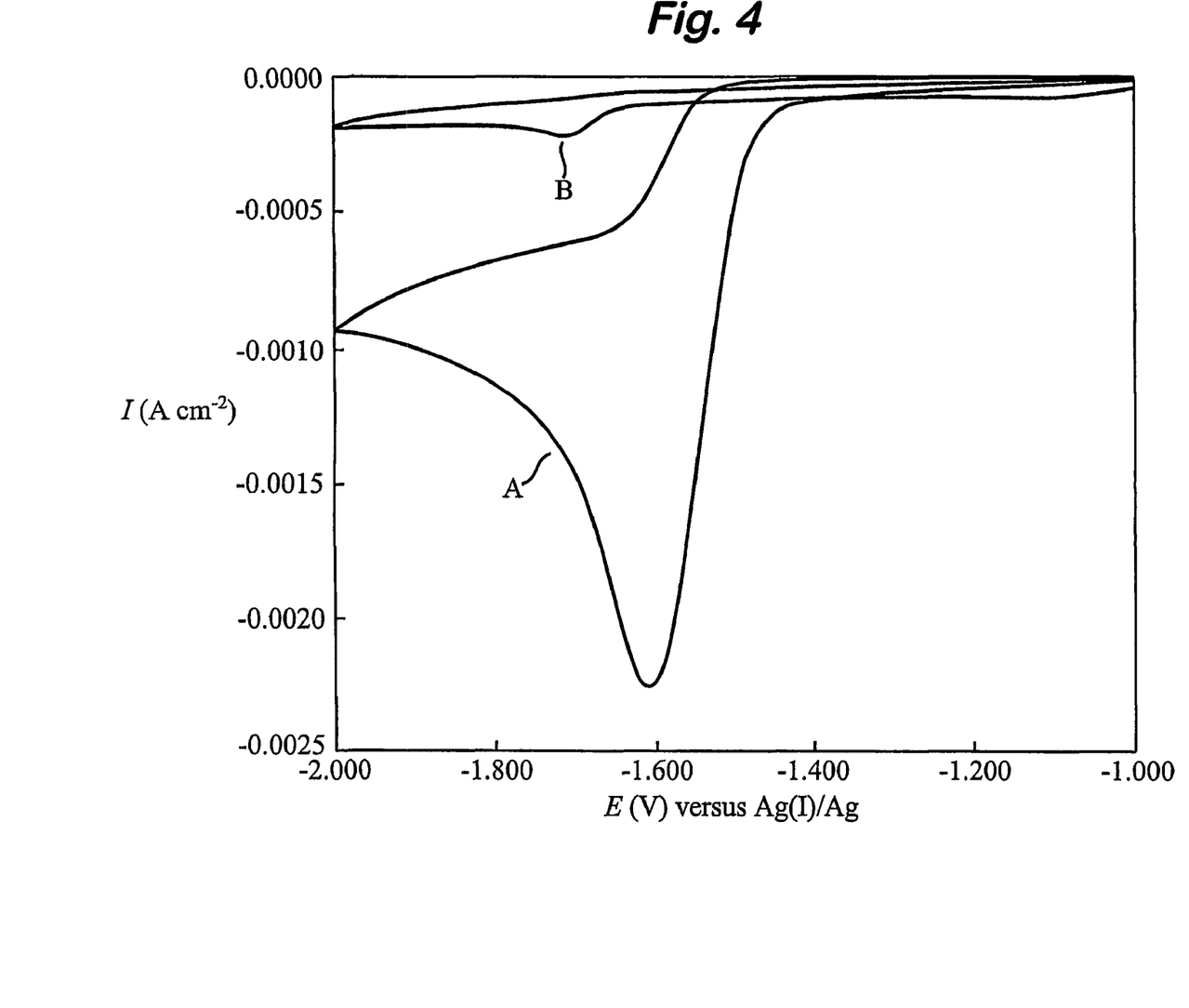
FIG. 4: Cyclic voltammograms recorded at a glassy carbon disk electrode in solutions of [bmim][PF$_6$] ionic liquids at 298 K containing 0.063 mol L$^{-1}$ N-methylphthalimide and 0.63 mol L$^{-1}$ phenol: (A) a prior to electrolysis; (B) following electrolysis at an applied potential of −1.7 V (Q=126.0 C).

Controlled potential electrolysis was carried out to determine the product formed after electrochemical reduction in the presence of phenol. A working electrode consisting of a glassy carbon flag (A~2 cm$^2$) was immersed in a [bmim][PF$_6$] solution containing 0.063 mol L$^{-1}$ N-methylphthalimide (0.101 g, 6.3×10$^{-4}$ mol) and 0.63 mol L$^{-1}$ phenol. A two-electron reduction of 100% reduction of the imide would require 121 C of charge ($Q_{Theor,100\%}$) to be passed during electrolysis. A platinum coil counter electrode was placed in a solution of pure [bmim][PF$_6$] separated from the bulk solution by a glass frit. The potential of the working electrode was held at $E_{app}$=−1.7 V. Electrolysis was halted after the passage of 126.0 C. Comparison of the peak cathodic current at a glassy carbon disk working electrode before (2.25×10$^{-2}$ A cm$^{-2}$) and after (1.12×10$^{-3}$ A cm$^{-2}$) electrolysis (FIG. 4) indicated that 95.0% of the N-methylphthalimide had reacted. The current efficiency was 91.2% ($Q_{Theor,95.0\%}$=115 C). The reaction was also monitored by high performance liquid chromatography (HPLC).

Figure 5A:
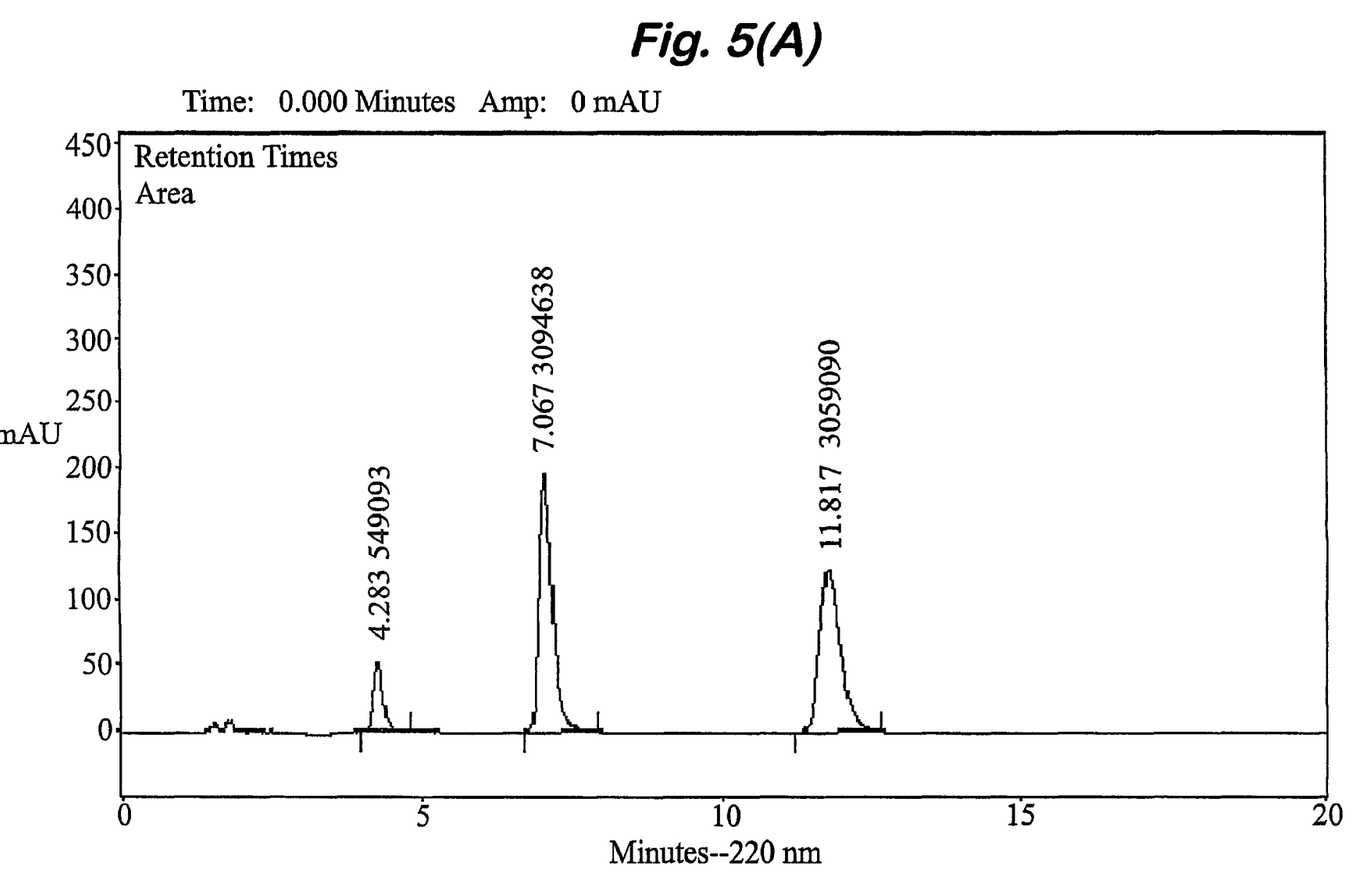
FIG. 5(A): HPLC analysis of [bmim][PF$_6$] ionic liquid solution containing 0.61 mol L$^{-1}$ phenol (Retention Time [RT]=7.1 min), 0.064 mol L$^{-1}$ N-methylphthalimide (RT=11.8 min) and 0.063 mol L$^{-1}$ N-methylhydroxyisoindol-1-one (RT=4.3 min) (standard).
Figure 5B:
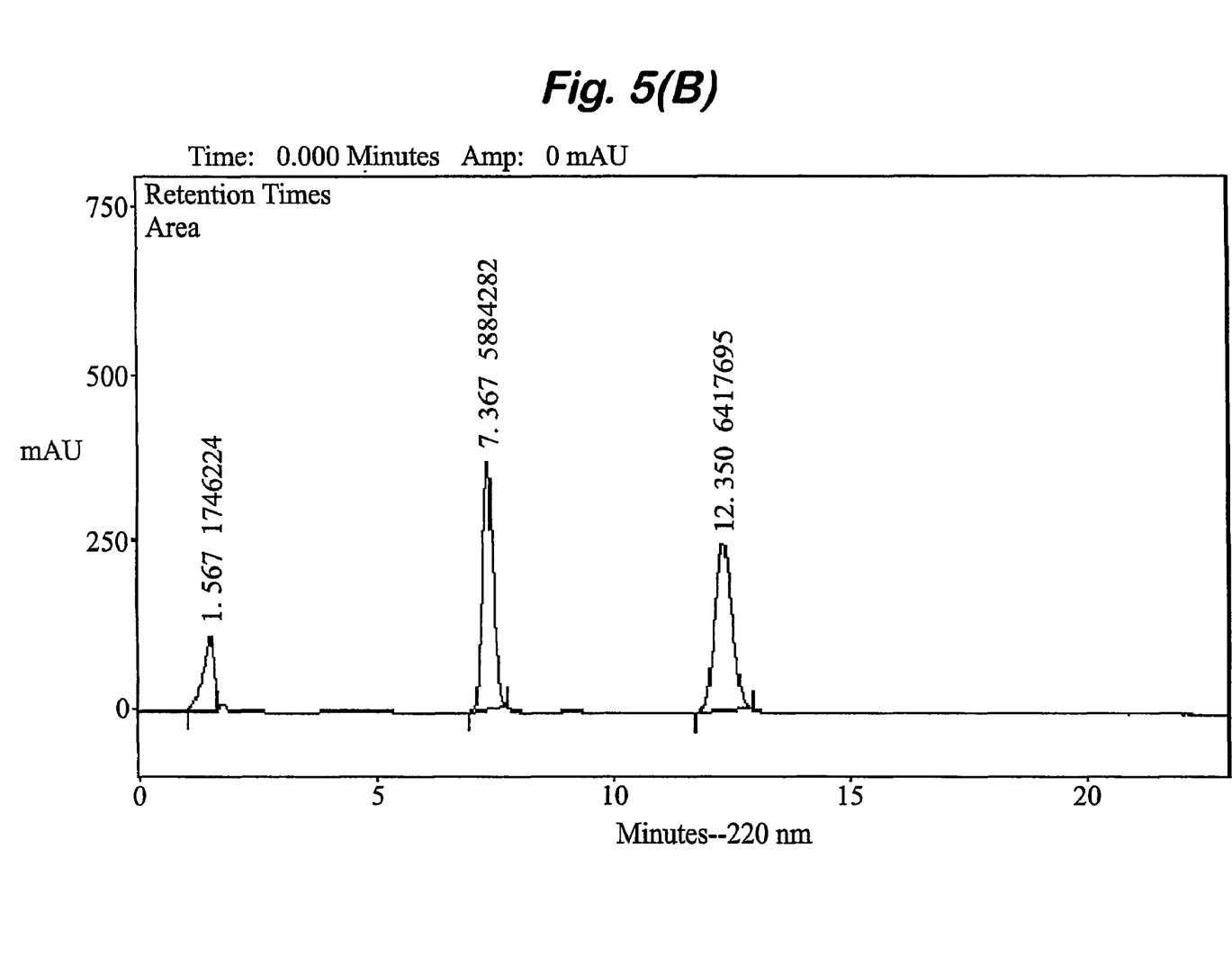
FIG. 5(B): HPLC analysis of [bmim][PF$_6$] ionic liquid solution (RT=1.6 min) containing 0.62 mol L$^{-1}$ phenol (RT=7.3 min), 0.065 mol L$^{-1}$ N-methyl phthalimide (RT=12.4 min) (before reaction).
Figure 5C:
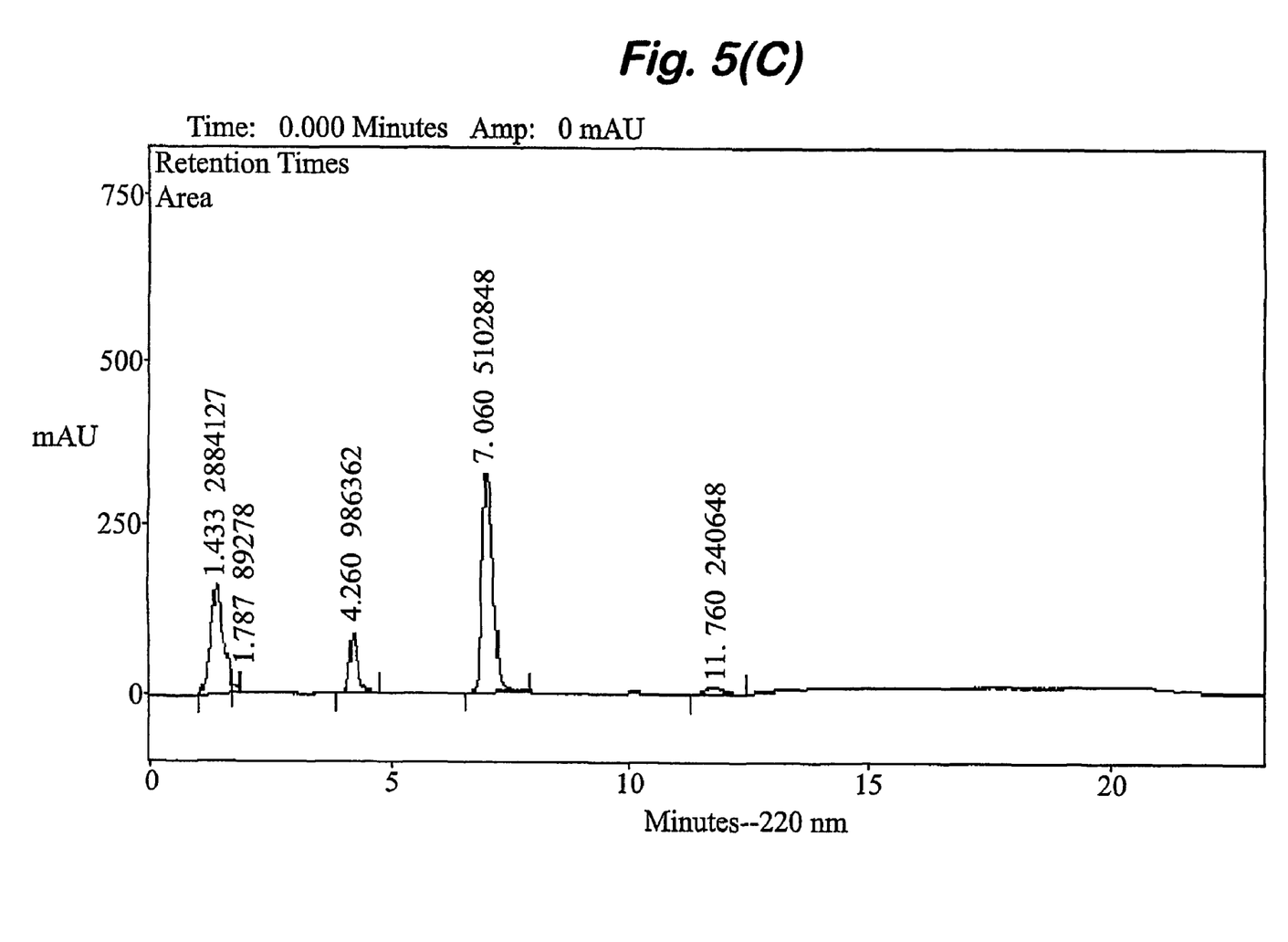
FIG. 5(C): HPLC analysis of [bmim][PF$_6$] ionic liquid (RT=1.4 min) solution initially containing 0.063 mol L$^{-1}$ N-methylphthalimide and 0.63 mol L$^{-1}$ phenol, following electrolysis at an applied potential of −1.7 V (Q$_T$=126.0 C).

Thus, FIG. 5(A) is an HPLC chromatogram of a standard solution containing 0.61 mol L$^{-1}$ phenol (Retention Time [RT]=7.1 min), 0.064 mol L$^{-1}$ N-methylphthalimide (RT=11.8 min) and 0.063 mol L$^{-1}$ N-methylhydroxyisoindol-1-one (RT=4.3 min). FIG. 5(B) is an HPLC chromatogram of [bmim][PF$_6$] ionic liquid solution (RT=1.6 min) containing 0.62 mol L$^{-1}$ phenol (RT=7.3 min), 0.065 mol L$^{-1}$ N-methyl phthalimide (RT=12.4 min) before the reaction. FIG. 5(C) is an HPLC analysis of [bmim][PF$_6$] ionic liquid (RT=1.4 min) solution initially containing 0.063 mol L$^{-1}$ N-methylphthalimide and 0.63 mol L$^{-1}$ phenol solution following electrolysis at an applied potential of −1.7 V ($Q_T$=126.0 C), of a solution. Thus, FIG. 5(C) indicates the presence of phenol, N-methylphthalimide and a single product. Quantitative analysis of the HPLC data, indicated a molar ratio of 19.8 between the product and the starting material. This represents a 95:5 molar ratio, consistent with the results obtained from the CV analysis.

The product was extracted from the ionic liquid reaction mixture with distilled water, the latter solvent forming a biphasic system with the hydrophobic ionic liquid. The extraction procedure involved shaking the ionic liquid with distilled water and decanting the upper aqueous phase. Thin layer chromatography (TLC) was used to analyse the ionic liquid layer after the extraction procedure; no product material was indicated. The aqueous washings were combined and concentrated with sodium chloride salt. The resulting aqueous suspension was shaken with diethyl ether to extract the product. Following the extraction procedure, TLC analysis (80:20 ethyl ethanoate:petroleum ether) of the aqueous phase did not indicate the presence of product material. The diethyl ether washings were combined and dried over magnesium sulfate. The suspension was gravity filtered and the diethyl ether solvent evaporated to yield a red, non-viscous oil (0.32 g). The crude oil was eluted on a flash silica column (50:50 ethyl ethanoate:hexane) and the product was obtained as a white solid (0.038 g, yield=38%).

The product was identified as 3-hydroxy-2-methyl-isoindolin-1-one by $^1$H and $^{13}$C nuclear magnetic resonance spectroscopy and electrospray mass spectrometry. Hence, the reduction of N-methylphthalimide to 3-hydroxy-2-methyl-isoindolin-1-one has been indicated. The low yield (0.038 g, 38%) is due to the handling of such small quantities. From the quantitative HPLC results, it can now be concluded that the 95% of starting material, which was consumed, had been converted to the product 3-hydroxy-2-methyl-isoindolin-1-one under the reaction conditions. The above example demonstrates that the process of the present invention may be used to produce a clean, quantitative conversion of the organic starting material. Furthermore, the electrochemical transformation is effected without side reactions. Thus, the reaction mixture is virtually free of side products and advantageously, the air- and moisture-stable ionic liquid can be recovered for reuse.

The invention claimed is:

1. A process for electrochemical transformation of an organic compound to form a product, said process comprising the steps of:
    (i) electrochemically effecting said transformation of the organic compound in the presence of an electrolyte comprising at least one room temperature ionic liquid to form the product, said ionic liquid being air-stable and moisture-stable, wherein the organic compound includes at least one structural element selected from the following: a carbon-halogen bond, a C≡C triple bond, an ester group, an ether group, a carboxylic acid group, an amido group, an imido group, —OH, —NO$_2$, an aldehyde group and a keto group, and
    (ii) separating the product.

2. The process according to claim 1 further comprising the recovery of said ionic liquid.

3. The process according to claim 1 wherein the electrochemical transformation is an oxidation, reduction, or a coupled pair of oxidation and reduction.

4. The process according to claim 1 wherein said structural element is oxidized or reduced.

5. The process according to claim 1 wherein the compound includes at least one structural element selected from the following: NO$_2$, an imido group, an aldehyde group and a carboxylic acid group.

6. The process according to claim 1 wherein the ionic liquid comprises an imidazolium, pyridinium, pyridazinium, pyrazinium, oxazolium, triazolium, pyrazolium, pyrrolidinium, piperidinium, tetraalkylammonium or tetraalkylphosphonium salt.

7. The process according to claim 6 wherein the ionic liquid has a melting point of up to 40° C.

8. The process according to claim 6 wherein the ionic liquid is substantially immiscible with water.

9. The process according to claim 1 wherein the ionic liquid is an air-and moisture stable room temperature ionic liquid selected from a compound of formula:

[N(R$^a$)$_4$]$^+$$_n$ [A]$^{n-}$, and [P(R$^a$)$_4$]$^+$$_n$ [A]$^{n-}$ wherein
each R$^a$ is independently selected from a C$_1$ to C$_{40}$ straight chain or branched alkyl or a C$_3$ to C$_8$ cycloalkyl group, wherein said alkyl or cycloalkyl group which may be substituted by one to three groups selected from: C$_1$ to C$_6$ alkoxy, C$_6$ to C$_{10}$ aryl, CN, OH, NO$_2$, C$_1$ to C$_{30}$ aralkyl and C$_1$ to C$_{30}$ alkaryl;
each R$^b$, R$^c$, R$^d$, R$^e$, R$^f$, R$^g$ and R$^h$ is the same or different and are each independently selected from hydrogen or any of the R$^a$ groups as defined above; and
[A]$^{n-}$ represents an anion having a charge n−; wherein n is 1-3.

10. The process according to claim 9 wherein the ionic liquid is an air-and moisture stable room temperature ionic liquid selected from a compound of formula:

wherein [A]$^{n-}$, R$^a$, R$^g$ and n are as defined in claim 9.

11. The process according to claim 9 wherein each R$^a$ represents C$_1$ to C$_{40}$ straight chain or branched alkyl.

12. The process according to claim 9 wherein each R$^a$ represents C$_1$ to C$_8$ straight chain or branched alkyl.

13. The process according to claim 9 wherein R$^g$ and R$^h$ represents C$_1$ to C$_{40}$ straight chain or branched alkyl.

14. The process according to claim 9 wherein R$^g$ and R$^h$ represents C$_1$ to C$_8$ straight chain or branched alkyl.

15. The process according to claim 9 wherein R$^b$, R$^c$, R$^d$, R$^e$, R$^f$, R$^g$ and R$^h$ each represents hydrogen.

16. The process according to claim 9 wherein R$^a$, R$^g$ and R$^h$ each represents a C$_1$-C$_{20}$ alkyl group.

17. The process according to claim 9 wherein [A]$^{n-}$ represents a single species of anion having valency n.

18. The process according to claim 9 wherein n is 1.

19. The process according to claim 9 wherein [A]$^{n-}$ represents an anion selected from [Cl]$^-$, [Br]$^-$, [I]$^-$, boron or phosphorus fluorides, [NO$_3$]$^-$, [SO$_4$]$^{2-}$, [HSO$_4$]$^-$, [HCO$_3$]$^-$, [(CF$_3$SO$_2$)$_2$N]$^-$, [AsF$_6$]$^-$, [SbF$_6$]$^-$, aryl sulfonates, alkylsulfonates, mono- or difluorinated alkyl sulfonates including perfluorinated alkylsulfonates, carboxylic acid anions, fluorinated carboxylic acid anions and metal halides.

20. The process according to claim 9 wherein [A]$^{n-}$ represents an anion selected from [PF$_6$]$^-$, [BF$_4$]$^-$, [OSO$_2$CF$_3$]$^-$, [OSO$_2$(CF$_2$)$_3$CF$_3$]$^-$, [(CF$_3$SO$_2$)$_3$C]$^-$, [CH$_3$CH$_2$SO$_3$]$^-$, [OCO$_2$CF$_3$]$^-$, [OCO$_2$(CF$_2$)$_3$CF$_3$]$^-$, [OCO$_2$CH$_3$]$^-$, nitrate, sulfate, hydrogensulfate, hydrogencarbonate, acetate, trifluoroacetate, lactate, [(CF$_3$SO$_2$)$_2$N]$^-$,[B(alkyl)$_4$]$^-$ wherein each alkyl is the same or different and is any straight chain or branched C$_1$ to C$_{10}$ alkyl group, [SbF$_6$]$^-$ and [AsF$_6$]$^-$.

21. The process according to claim 9 wherein [A]$^{n-}$ represents an anion selected from [PF$_6$]$^-$, [BF$_4$]$^-$ and [(CF$_3$SO$_2$)$_2$N]$^-$.

22. The process according to claim 1 wherein the ionic liquid is 1-butyl-3-methylimidazolium hexafluorophosphate or N-butyl-N-methyl-pyrrolidinium bis(trifluoromethanesulfonyl)imide.

23. The process according to claim 1 wherein the electrochemical transformation is carried out in the presence of a proton source.

24. The process according to claim 23 wherein the proton source is selected from phenol, a mineral acid, an organic acid, a conjugate acid of the anion A, or water.

25. The process according to claim 23 wherein the proton source is phenol.

26. The process according to claim 1 wherein the electrochemical transformation is conducted at a temperature within the molten range of the electrolyte.

27. The process according to claim 1 wherein the product formed by the transformation is separated from the ionic liquid by solvent extraction, distillation, precipitation or as an immiscible liquid layer.

28. The process according to claim 1 wherein the ionic liquid is reusable after recovery of the product.

29. The process according to claim 1 wherein the ionic liquid is reusable directly after recovery of the product.

30. A process according to claim 1 wherein the organic compound is N-methylphthalimide, the transformation is reduction, and the ionic liquid is 1-butyl-3-methylimidazolium hexafluorophosphate.

* * * * *